United States Patent
Yeh et al.

(10) Patent No.: US 10,264,082 B2
(45) Date of Patent: Apr. 16, 2019

(54) METHOD OF PRODUCING BROWSING ATTRIBUTES OF USERS, AND NON-TRANSITORY COMPUTER-READABLE STORAGE MEDIUM

(71) Applicant: INDUSTRIAL TECHNOLOGY RESEARCH INSTITUTE, Hsinchu (TW)

(72) Inventors: Yi-Jen Yeh, Zhubei (TW); Chin-Yang Lin, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 209 days.

(21) Appl. No.: 15/388,500

(22) Filed: Dec. 22, 2016

(65) Prior Publication Data
US 2018/0139296 A1 May 17, 2018

(30) Foreign Application Priority Data
Nov. 11, 2016 (TW) ............................. 105136935 A

(51) Int. Cl.
*H04L 29/08* (2006.01)
*H04L 29/12* (2006.01)

(52) U.S. Cl.
CPC .............. *H04L 67/22* (2013.01); *H04L 61/30* (2013.01); *H04L 67/02* (2013.01)

(58) Field of Classification Search
CPC ......... H04L 67/20; H04L 67/22; H04L 67/02; H04L 61/30; H04L 61/103; G06F 17/3053; G06F 17/30699; G06F 17/30902; G06F 17/30528; G06F 17/30038; G06F 17/30274

USPC ........................................................ 709/224
See application file for complete search history.

(56) References Cited

U.S. PATENT DOCUMENTS

| | | | |
|---|---|---|---|
| 6,385,619 B1 | 5/2002 | Eichstaedt et al. |
| 8,443,452 B2 | 5/2013 | Koulinitch et al. |
| 8,805,339 B2 | 8/2014 | Ramer et al. |
| 8,863,000 B2 | 10/2014 | Broman |

(Continued)

FOREIGN PATENT DOCUMENTS

| | | | |
|---|---|---|---|
| CN | 101071424 A | 11/2007 |
| CN | 101189608 A | 5/2008 |

(Continued)

OTHER PUBLICATIONS

Machine Translation, CN 105574216, "Personalized recommendation method and system based on probability model and user behavior analysis", May 2016, patents.google.com/patent/CN105574216A/en (Year: 2016).*

(Continued)

*Primary Examiner* — Ruolei Zong
(74) *Attorney, Agent, or Firm* — Maschoff Brennan

(57) ABSTRACT

Disclosed is a method of producing browsing attributes of a user, and the method includes: searching for a web site group in a web browsing history; acquiring a tag of the website group according to a percentage of a web category of the website group; obtaining a browsing preference attribute of the user by calculating a similarity; and obtaining a present browsing mode attribute of the user by analyzing a purity by the web browsing history of the user.

7 Claims, 4 Drawing Sheets

(56) References Cited

U.S. PATENT DOCUMENTS

| | | |
|---|---|---|
| 9,400,995 B2 | 7/2016 | Gu et al. |
| 9,723,053 B1* | 8/2017 | Pallemulle .............. H04L 67/02 |
| 2001/0056405 A1 | 12/2001 | Muyres et al. |
| 2003/0074400 A1 | 4/2003 | Brooks et al. |
| 2006/0224583 A1* | 10/2006 | Fikes ................ G06F 17/30867 |
| 2008/0015878 A1 | 1/2008 | Feng et al. |
| 2009/0132395 A1 | 5/2009 | Lam et al. |
| 2009/0287657 A1* | 11/2009 | Bennett ............ G06F 17/30867 |
| 2009/0293018 A1* | 11/2009 | Wilson .............. G06F 17/30864 |
| | | 715/811 |
| 2013/0054433 A1 | 2/2013 | Giard et al. |
| 2017/0060872 A1* | 3/2017 | Sacheti ............... G06F 17/3053 |

FOREIGN PATENT DOCUMENTS

| | | | | |
|---|---|---|---|---|
| CN | 102741839 A | | 10/2012 | |
| CN | 102822815 A | | 12/2012 | |
| CN | 103995858 A | | 8/2014 | |
| CN | 105574216 | * | 5/2016 | ............ G06F 17/30 |
| CN | 105574216 A | | 5/2016 | |
| TW | 201104617 B | | 2/2011 | |
| TW | 201310377 A1 | | 3/2013 | |
| TW | 201319983 A1 | | 5/2013 | |

OTHER PUBLICATIONS

Košir Domen, Igor Kononenko, and Zoran Bosnić. "Web user profiles with time-decay and prototyping." Applied Intelligence 41.4 (2014): 1081-1096.

Fawcett, Tom, and Foster J. Provost. "Combining Data Mining and Machine Learning for Effective User Profiling." KDD. 1996.

Golemati, Maria, et al. "Creating an ontology for the user profile: Method and applications." Proceedings of the first RCIS conference. No. 2007. 2007.

Gulla, Jon Atle, et al. "Implicit User Profiling in News Recommender Systems." WEBIST (1). 2014.

Jeon, Hochul, Taehwan Kim, and Joongmin Choi. "Personalized Information Retrieval by Using Adaptive User Profiling and Collaborative Filtering." AISS2.4 (2010): 134-142.

TW Office Action dated Feb. 7, 2017 as received in Application No. 105136935.

* cited by examiner

| item | cat | domain |
|---|---|---|
| shopping.pchome.com.tw | Shopping and Auction | pchome |
| shopping.udn.com | Shopping and Auction | udn |
| www.books.com.tw | Shopping and Auction | books |
| www.gohappy.com.tw | Shopping and Auction | gohappy |
| www.momoshop.com.tw | Shopping and Auction | momoshop |
| www.pcstore.com.tw | Shopping and Auction | pcstore |
| www.pingle.com.tw | Shopping and Auction | pingle |
| udn.com | News and Media | udn |
| www.appledaily.com.tw | News and Media | appledaily |
| www.chinatimes.com | News and Media | chinatimes |
| www.ettoday.net | News and Media | ettoday |
| www.nownews.com | News and Media | nownews |
| pda.104.com.tw | Job Search | 104 |
| www.104.com.tw | Job Search | 104 |
| www.518.com.tw | Job Search | 518 |
| www.1111.com.tw | Job Search | 1111 |
| www.yes123.com.tw | Job Search | yes123 |

FIG. 4

METHOD OF PRODUCING BROWSING ATTRIBUTES OF USERS, AND NON-TRANSITORY COMPUTER-READABLE STORAGE MEDIUM

CROSS-REFERENCE TO RELATED APPLICATIONS

This non-provisional application claims priority under 35 U.S.C. § 119(a) on Patent Application No(s). 105136935 filed in Taiwan, R.O.C. on Nov. 11, 2016, the entire contents of which are hereby incorporated by reference.

TECHNICAL FIELD

The disclosure relates to a method of producing browsing attributes of a user, and a non-transitory computer-readable storage medium.

BACKGROUND

Most of modern methods of product recommendation or digital advertising are to find out one or more products or information, interesting to a user, from the user's past browsing history and then post the one or more products or information in the web page presently browsed by the user, in order to enhance the opportunity for the user to purchase the promoted product or click the posted advertisement. However, such an analysis process mainly focuses on discovering a specific item or goods appearing on the website browsed by a user, but seldom focuses on discovering inter-site browsing attributes of the user.

SUMMARY

According to one or more embodiments, the disclosure provides a method of producing browsing attributes of a user, and the method includes: searching for a website group in a web browsing history; acquiring a tag of the web site group according to a percentage of a web category of the web site group; obtaining a browsing preference attribute of the user by calculating a similarity; and obtaining a present browsing mode attribute of the user by analyzing a purity by the web browsing history of the user.

According to one or more embodiments, the disclosure also provides a non-transitory computer-readable storage medium applied to a computer program product that stores instructions configured to control a computing apparatus to execute the foregoing method.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 exemplarily illustrates a list of tracks of a browsing mode attribute of the user in the disclosure.

DETAILED DESCRIPTION

Figure 1:
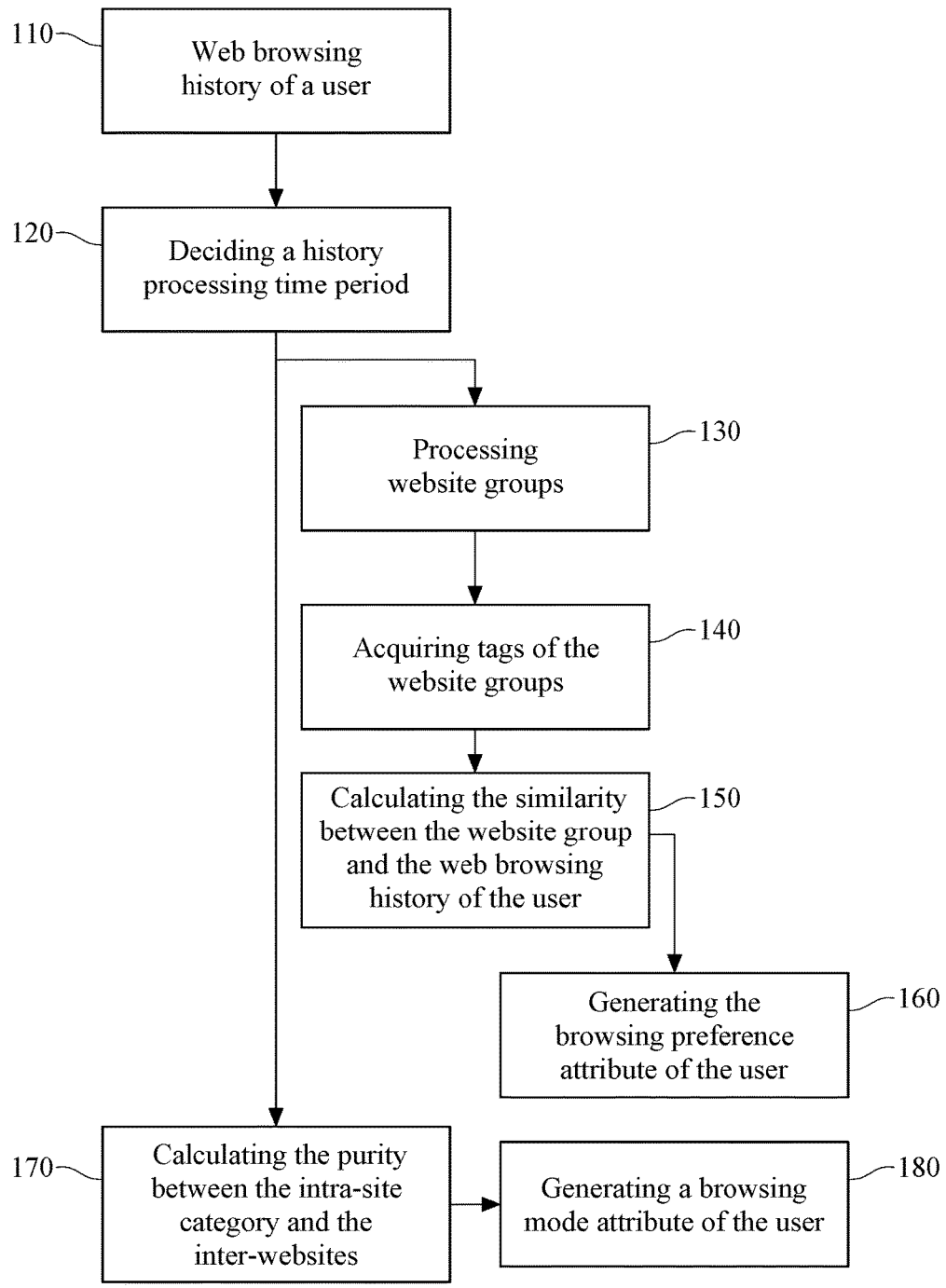
FIG. 1 exemplarily illustrates a flow chart of producing browsing attributes of a user in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides a method of producing browsing attributes of a user, which mainly intends to find out websites clustered (i.e. website clustering) on the basis of data of inter-site browsing of the user, then define a tag for each website group according to the percentage of each website category, and subsequently calculate the similarity of the tag of each web site group by the recent web site browsing data of the respective user, in order to decide the browsing preference attribute (tag) of this respective user. Moreover, the present browsing mode attribute of the user is classified as a sojourner type, a resident type, an inter-wanderer type or an intra-wanderer type according to a ratio between the purity of the inter-site category and the purity of inter-site primary website of the user, and serves as a reference of product recommendation and digital advertising, through which the success rate of product recommendation and digital advertising may be enhanced.

For an inter-site browsing behavior, the related details are exemplarily explained as follows. In an example, after a user A, who would like to purchase a single-eye camera, searched for the key word "single-eye camera" in the Google Search, the user A one by one opened and browsed a number of electronic commerce websites in the search result; then, the user A opened Mobile01.com (which is a Chinese social networking site for consumer electronic products) to browse other people's unboxing posts; and eventually, the user A opened a price comparison website to survey the price of goods posted in each electronic commerce website. In this case, the user A made a sequential behavior pattern before purchasing a product, and this sequential behavior pattern is constituted by a series of websites, such as electronic commerce, internet forums and price comparison websites, related to the purpose of the user A. Thus, if the attribute of such a browsing behavior for purchase can be found, the user's purchase and activity intentions could further be handled.

The disclosure also explores inter-site categories and the attributes of inter-primary websites for the understanding of the intention of a user's behavior. For example, if the user A opened various websites all belonging to the category of shop website, it denotes that the user A has a definite intention of shopping; and if the user A opened various websites belonging to different web site categories, such as shopping, life and so on, it may denote that the user A just aimlessly browed these websites. The disclosure intends to explore the attribute of web browsing behaviors of users and find out their browsing preference attributes and browsing mode attributes for an accurate reference of product recommendation and digital advertising.

FIG. 1 is a flow chart of producing browsing attributes of a user in the disclosure. In step 110, the website browsing data of each user, such as a web browsing history (cs_uid), a click stream or web browsing logs, is acquired. The website browsing data of a user includes a user ID, a time series, an inter-browsing log, and so on. In step 120, a history processing time period is decided in accordance with a usage circumstance. In an example, a longer time period, e.g. one year, is decided for the observation of a general direction or a market trend; and in another example, a shorter time period, e.g. one week or one month, is decided for the observation of a short-term situation. In step 130, a number of groups of website records frequently appearing together, i.e. a number of website groups, are chosen from all of the web site browsing data by a clustering algorithm. Frequently appearing is based on a threshold defined by the clustering algorithm. In step 140, the representative category of each website is acquired, and then the web category with a relatively-high percentage is selected according to the percentage of each web category in the record of each web site group and is set as a tag of the web site group. In step 150, the similarity between each website group in step 140 and the web browsing logs of each user is calculated, and these users are sorted into the website groups. In step 160, the tag of the web site group of each user is set as the browsing preference attribute of the user. In step 170, the web browsing logs of each user obtained in the processing time period defined in step 120 are converted into a web category browsing record, and then the purity of the inter-site category and the purity of the inter-primary domain. In step 180, a browsing mode attribute of each user, such as a sojourner type, a resident type, an inter-wanderer type, or an intra-wanderer type, is produced.

One or more embodiments of obtaining the user's browsing preference attribute, i.e. one or more embodiments of details of steps 120~160 are exemplarily explained as follows. The user's browsing mode attribute is to define a popular set of specific intentions or behavior histories by finding out a common browsing history of a colony.

cs_uid1_x:{i1, i2, i3, i4, . . . } --Price Comparison, . . .
cs_uid2_x:{i2, i3, i4, i6, . . . } --Price Comparison, . . .
cs_uid2_x:{i10, i11, i2, i13, . . . } --Cosmetics, . . .
cs_uid3_x:{i3, i4, i15, i2, . . . } --Price Comparison, . . .
cs_uid3_x:{i10, i11, i18, i19, . . . } --Cosmetics, . . .

In view of the above list, {i2, i3, i4} is considered a common history of a price comparison category (a certain price comparison tag). Then, this common history is compared with the long-term past web browsing history of the user to backwardly deduce the user's personal preference attribute tag. In this way, initial demassification is achieved.

Accordingly, this particular step is divided into the following two stages.

Stage 1: finding out a set X={x1, x2, . . . , xm} for a common popular web browsing history that is frequently clustered with people. Each xi∈X indicates a website group set including at least one website, and the tag of xi (e.g. price comparison or job search) is defined by a main category (e.g. a category with a relatively-high percentage) of the website group, wherein 1≤i≤m, and m is a positive integer.

Stage 2: providing an algorithm for tagging users. The input of this algorithm is X and the web browsing history (cs_uid) of a respective user, and the output of this algorithm is a weight value of the tag of each website group in the X related to the user, e.g. Label (uid)=<x1 (50%), x2 (30%), . . . >.

For the analysis of group behavior or history, multiple related technologies can be used as a reference. For example, a frequent itemset mining (FIM) algorithm and an association rules (AR) algorithm are often used in a typical market basket analysis or affinity Analysis to explore customers' buying habits (i.e. the association between purchased products).

Apriori algorithm is a typical algorithm of calculating association rules. During the calculation, many frequent itemsets are also produced. For example, {A, B} as a frequent itemset indicates the degree of A and B appearing together in transaction data is larger than a certain threshold that is called a level of support.

In an embodiment of the disclosure, sampled data is 10% of the website browsing data of the user randomly chosen in the sequential 9 days. Since the input data of FIM belongs to transaction type data, each log (i.e. table row) denotes the browsing history (i.e. clickstream) of a certain user in a single time period or session.

After the FIM is executed, it is obviously found that these frequent itemsets are basically constituted by websites belonging to similar categories, i.e. website groups. For example, a website group {www.yes123.com.tw, www.1111.com.tw, www.104.com.tw, pda.104.com.tw, www.518. com.tw} collects a group of websites belonging to the category of job search, and this website group denotes that a common web history of most of job seekers can be defined; and optionally, the user's history is similar to this frequent itemset so that it is deduced that this user is seeking employment. Moreover, a number of frequent itemsets related to purchases may also be observed. Through such auxiliary information, e.g. frequent itemsets, more histories of popular websites having high homogeneity can be found. Therefore, the possible range or scope of the history of a user belonging to a certain category may be understood more. For example, a set of popular websites all belonging to the attribute of purchasing, e.g. {www.momoshop.com.tw, shopping.udn.com, shopping.pchome.com.tw, www.pingle.com.tw, www.gohappy.com.tw, . . . }, can be found though the above auxiliary information.

These frequent itemsets can be used to define the browsing preference attributes of a group of users, and a similarity illustrates how the browsing logs of a respective user are similar to the frequent itemsets. When the similarity is sufficiently high, e.g. larger than a threshold, the same tag will be assigned to the user and the frequent itemsets and will be set as the browsing preference attribute of the user in an embodiment of the disclosure.

The following exemplarily illustrates the user's browsing mode attribute, i.e. step 120 to step 180. The user's browsing mode attribute is calculated and classified according to the web category purity and the intra-site behavior purity in view of the web browsing behavior of the user associated with a web browsing history (e.g. a web browsing history in a certain time period s is exemplarily expressed by s={i1, i2, . . . , in}).

The web category purity in the disclosure is external classifying data passing through the FortiGuard firewall. Each website link has a category so that the web browsing history s has a corresponding category set {t1, t2, . . . , tn}. The definition of the web category purity (P_cat) is expressed as follows:

$$P\_cat = \frac{size\ of\ majority\ type\ in\ s}{n}.$$

In other words, this web category purity is a percentage of at least one website links belonging the same web category among all website links in the web browsing history.

When the P_cat value is relatively high, it denotes that the web browsing history in the section s has relatively-high homogeneity. For example, when P_cat=1, it denotes that the all of the n links belong to the same web category; and if this web category is job search, the web browsing history in the section s may connote that the user is seeking employment. When the P_cat value is relatively low, it denotes that the browsing history in the section s has a relatively-divergent (or moot) intension.

The term "intra-site" in the intra-site behavior purity in the disclosure denotes that the website's web address has the same primary domain name (referred to as second-level domain label herein). For example, the web addresses {'tw.yahoo.com', 'tw.news.yahoo.com', 'tw.search.yahoo.com'} are intra-site links belonging to Yahoo, this primary domain name. Similar to the P_cat, the definition of the intra-site behavior purity (P_ins) is expressed as follows:

$$P\_ins = \frac{\text{size of majority site in } s}{n}.$$

In other words, this intra-site behavior purity is the percentage of at least one website link having a web address belonging to the same primary domain among all website links in the web browsing history.

When the P_ins value is relatively high, it denotes that the intra-site behavior of the web browsing history in the section s is more. For example, when P_ins=1, it denotes that all of the n links belong to intra-site behaviors; and if this website is Yahoo, it denotes that the browsing habit of the web browsing history in the section s tends to this Yahoo website. When the P_ins value is relatively low, it denotes that the web browsing history in the section s has an attribute of inter-site browsing.

Figure 2:
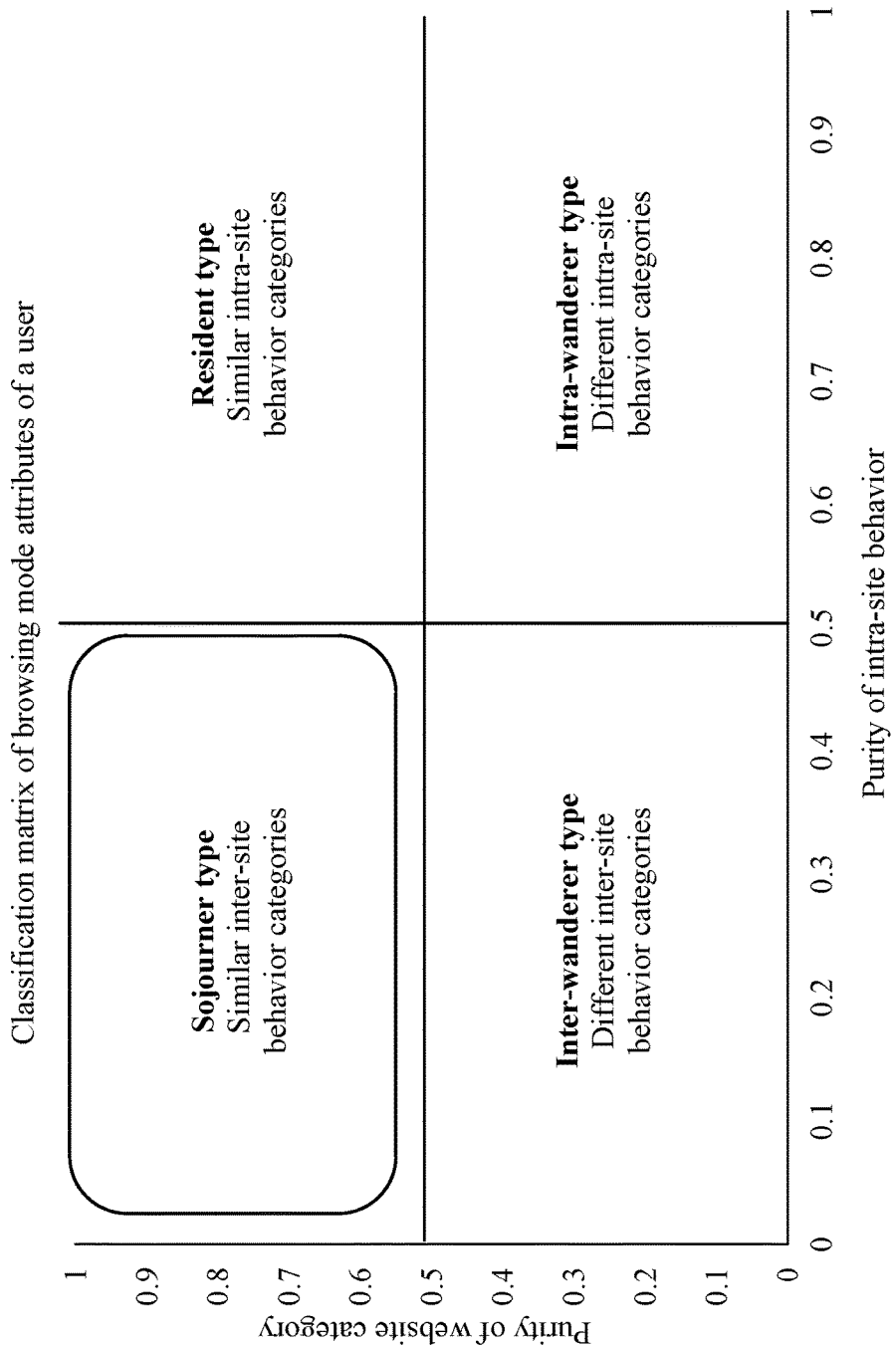
FIG. 2 exemplarily illustrates a browsing mode attribute of the user in the disclosure.

According to the web category purity and the intra-site behavior purity, any section of the web browsing history can correspond to a classification matrix of browsing mode attributes of a user in FIG. 2, e.g. a category-domain coherence (CDC) matrix. For convenience, the CDC Matrix is initially divided into four blocks each corresponding to a different browsing mode.

The sojourner type browsing mode attribute of the user, as shown at the upper left side of FIG. 2: a browsing behavior of browsing a number of websites of similar categories to and fro. For example, price comparison is carried out by surveying goods on a number of different websites. Since the behaviors of sojourner type users usually tend to searching for a certain object or researching a certain theme, these users can be reasonably assumed to be potential advertisement receivers.

The resident type browsing mode attribute of the user, as shown at the upper right side of FIG. 2: a browsing behavior of staying at a specific website to browse contents belonging to similar categories, namely an intra-site browsing behavior for a single purpose. For example, a user is used to browse through commodities in series of websites of momo.com Inc. or PChome Online Inc. Since the intention is definite, these users are also reasonable advertisement receivers.

The inter-wanderer type browsing mode attribute of the user, as shown at the lower left side of FIG. 2: a browsing behavior of browsing a number of web sites to and fro without any definite purpose (dispersive browsing categories). Since the tracks are divergent, such a browsing behavior may be an aimless browsing behavior or be a comprehensive inter-site behavior with one or more intentions that are too hard to be interpreted.

The intra-wanderer type browsing mode attribute of the user, as shown at the lower right side of FIG. 2: a browsing behavior lacking of any definite purpose in a specific website (dispersive browsing categories). The intra-wanderer type browsing behavior is similar to the inter-wanderer type browsing behavior, but the intra-wanderer type browsing behavior tends to be done in a website that is usually a larger compound website with various web categories, such as Yahoo. A preference attribute classifier of click streams can simply be defined by the following browsing-mode program (program browsing-mode):

Input: a click stream s={i1, i2, . . . in}; the parameter K (between 0 and 1) defines a threshold for a purity that is used to determine whether web categories are similar or different; and the parameter L (between 0 and 1) defines a threshold for a purity that is used to distinguish an inter-site behavior from an intra-site behavior.

Output: a browsing mode attribute that is the sojourner type (S-mode), the resident type (R-mode), the inter-wanderer type (cW-mode) or the intra-wanderer type (iW-mode).

program browsing-mode (s):
if P_cat (s)≥K and P_ins (s)≤L: return S-mode
elif P_cat (s)≥K and P_ins (s)>L: return R-mode
elif P_cat (s)<K and P_ins (s)≤L: return cW-mode
else P_cat (s)<K and P_ins (s)>L: return iW-mode.

Assume a set S={s1, s2, . . . sn} constituted by a group of web browsing histories denotes a group of web browsing histories that a certain user made in a time period, the set S can be applied by the program browsing-mode (s) to the CDC Matrix in FIG. 2 for the analysis of browsing behavior.

According to the above embodiment of the disclosure, the foregoing web click frequent itemset of a group of users, X={x1, x2, . . . xn}, is also applied to the CDC Matrix for the comprehensive analysis of web browsing behaviors of a group of users. Because of the similar input constructions, the process needs to set the web click frequent itemset X as a replacement for the parameter (argument) S of the following program browsing-mode-summary (S).

program browsing-mode-summary (S):
for each s in S:
count browsing-mode(s) by modes (S-mode, R-mode, cW-mode and iW-mode)
display count and percentage for each mode
return mode x such that x.count is the maximum (among the four modes)

The relevant data observation is discussed below.

For the comprehensive analysis and discussion on the group browsing behavior in view of the web click frequent itemset by the CDC Matrix, the sampled data is also 10% of the sequential 9-day web browsing history of the user that is randomly sampled and then is subjected to a suitable data process.

Figure 3:
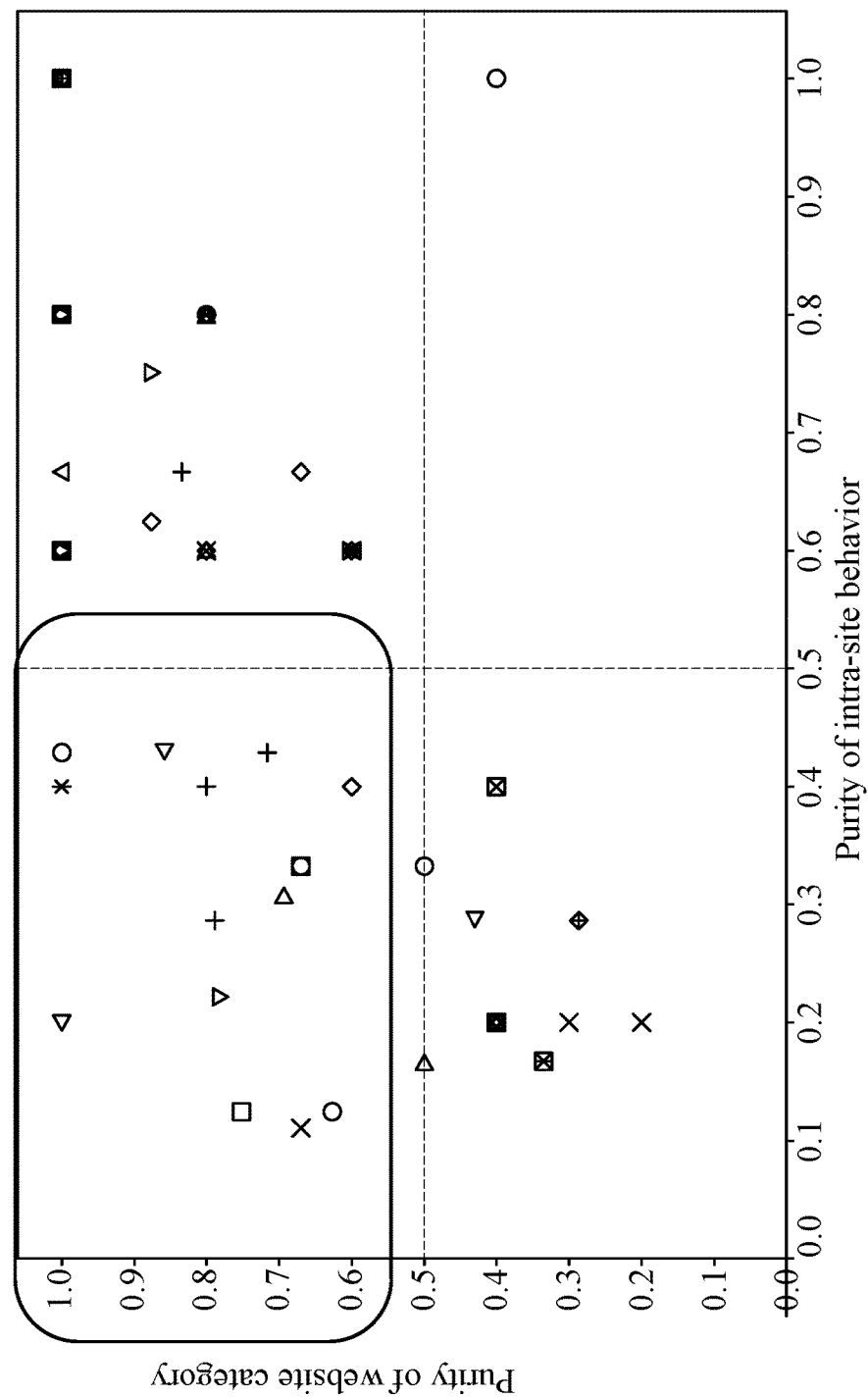
FIG. 3 exemplarily illustrates tracks of a browsing mode attribute of the user in the disclosure.

FIG. 3 exemplarily illustrates the distribution of applying web click frequent itemsets to the CDC Matrix (based on K=0.5 and L=0.5), wherein each symbol represents one frequent itemset. In FIG. 3, it can be observed that most of popular web browsing histories fall in the upper part (the sojourner type and the resident type) since a popular common web browsing history usually has a relatively-definite intention (relatively-high P_cat value) but an aimless web browsing history more uneasily forms a frequent itemset as compared to a popular common web browsing history.

The sojourner type web browsing history is in the majority. This indicates that users usually look for inter-site resources when concentrating their attention on searching for a certain object or researching a certain topic. For example, a web browsing history for job search may include one or more popular job search websites, such as 104, 518, 1111, yes123 and so on, as shown in FIG. 4.

On the whole, the classifying of browsing modes and the analysis of the tendency of browsing behavior may be performed according to the web category purity (P_cat) and the intra-site purity (P_ins) and potential advertisement receivers including sojourner type and resident type users may be found, as long as web browsing histories and their categories can be obtained.

In addition to striving for the exposure of products and services by the product recommendation and the digital advertising, electronic commerce traders nowadays can further use the disclosure to powerfully react to users' present requirements and situations and enhance the possibility of marketing products and services.

In another embodiment, the disclosure also provides a non-transitory computer-readable storage medium applied to a computer program product that stores instructions configured to control a computing apparatus to execute the foregoing method of producing browsing attributes of a user.

What is claimed is:

1. A method of producing browsing attributes of a user, comprising:
    searching for a website group according to a web browsing history of a group of users, wherein the website group includes at least one web and each of the at least one web has a web category;
    acquiring a tag of the website group according to a percentage of a web category of the at least one web website group;
    obtaining a browsing preference attribute of a respective user by calculating a similarity, wherein the similarity is a similarity between a web browsing history of the respective user and the website group; and
    obtaining a present browsing mode attribute of the respective user by analyzing a purity by the web browsing history of the respective user, wherein the purity is decided by a web category purity and an intra-site behavior purity.

2. The method according to claim 1, wherein the website group is found according to a clustering algorithm.

3. The method according to claim 1, wherein the tag is produced by selecting the web category with a highest percentage according to the percentage of the web category of the website group.

4. The method according to claim 1, wherein when the similarity is highest, the browsing preference attribute of the respective user is set as the tag of the website group.

5. The method according to claim 1, wherein the web category purity is a percentage of at least one website link of the same web category among all website links in the web browsing history.

6. The method according to claim 1, wherein the intra-site behavior purity is a percentage of at least one website link, having a web address belonging to the same primary domain, among all website links in the web browsing history.

7. A non-transitory computer-readable storage medium, applied to a computer program product that stores instructions configured to control a computing apparatus to execute the method of claim 1.

* * * * *